May 4, 1954

C. F. SMITH 2,677,191

APPARATUS FOR MEASURING RADII

Filed Jan. 22, 1952

INVENTORS
CHARLES F. SMITH
RALPH L. SCHUMAN
BY Toulmin & Toulmin
ATTORNEYS

Patented May 4, 1954

2,677,191

UNITED STATES PATENT OFFICE 2,677,191

APPARATUS FOR MEASURING RADII

Charles F. Smith, Martins Ferry, Ohio, and Ralph L. Schuman, Moundsville, W. Va.

Application January 22, 1952, Serial No. 267,610

8 Claims. (Cl. 33—178)

This invention relates to gauges and measuring instruments, and to methods of operation thereof, and in particular to an improved instrument of this type for measuring radii.

In the art of gauging and measuring, it has always been rather difficult to effect a proper measurement of the radius of a cylindrical surface and also to detect variations in the said radius. This difficulty obtains for both inside and outside cylindrical surfaces, but has been particularly difficult in connection with inside surfaces, especially as to obtaining an effective and reliable indication of the eccentricity of the said surface.

Having the foregoing in mind, the primary object of the present invention is to provide a greatly improved arrangement for measuring the radius of an inside cylindrical surface.

Another object is to provide a highly accurate instrument for measuring an inside cylindrical surface which is relatively inexpensive to construct.

Another object of this invention is the provision of a highly accurate and inexpensive gauging instrument for measuring inside cylindrical surfaces in which all of the critical elements of the gauge having surfaces thereon that must be finely machined and which determine the accuracy of the instrument are such that they can readily be formed by standard machines in a highly accurate manner.

A still further object is the provision of a gauge of the nature described which is operable for readily indicating eccentricities in the surface being measured.

A still further object is the provision of an instrument of the type referred to which is extremely rugged and is not easily thrown out of adjustment by rough usage.

These and other objects and advantages will become more apparent upon reference to the following description taken in connection with the accompanying drawings, in which.

Figure 1:
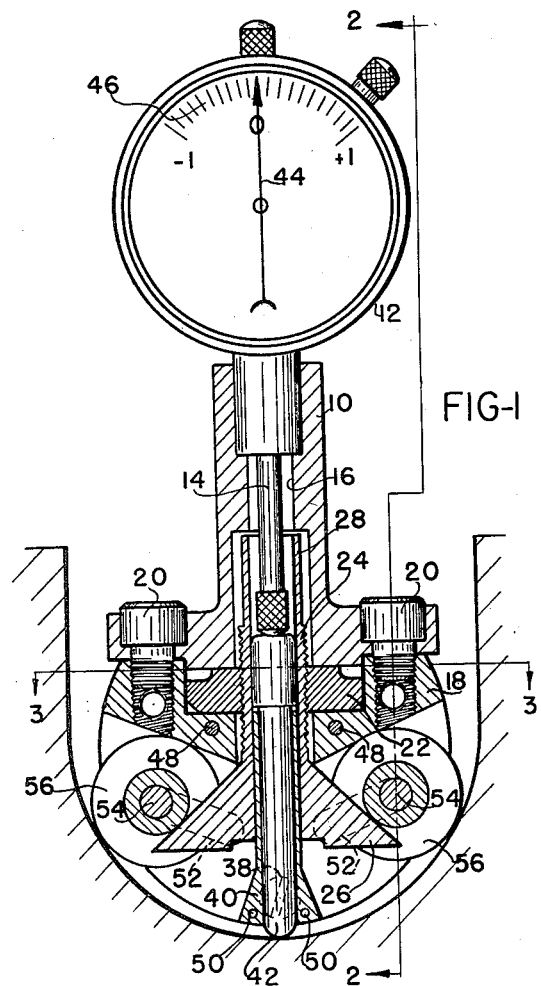
Figure 1 is a front view of the instrument of this invention partly in section, as indicated by line 1—1 on Figure 2.

Referring to the drawings somewhat more in detail, the instrument comprises an indicator mounting block 10, having a dial type indicator 12 of the usual construction mounted at the upper end. The spindle of the dial indicator at 14 extends downwardly into bore 16 of the indicator mounting block.

Immediately beneath the indicator mounting block is a member 18 forming a roller track, and which is clamped to a machined surface on the underside of the indicator mounting block by the cap screws 20. Roller track member 18 is centrally notched for receiving a knurled cam nut 22 that is threaded onto the hollow shaft 24, which carries at its lower end the V-shaped roll locating cam 26. This nut has a greater diameter than the thickness of block 10 for ease of actuation of the nut. The extreme upper end of hollow shaft 24 includes the smooth cylindrical portion 28, and this portion of the shaft is arranged to be visible through a window 30 formed in one side of the indicator mounting block and carries graduations 32 for a purpose which will become more apparent hereinafter.

Figure 2:
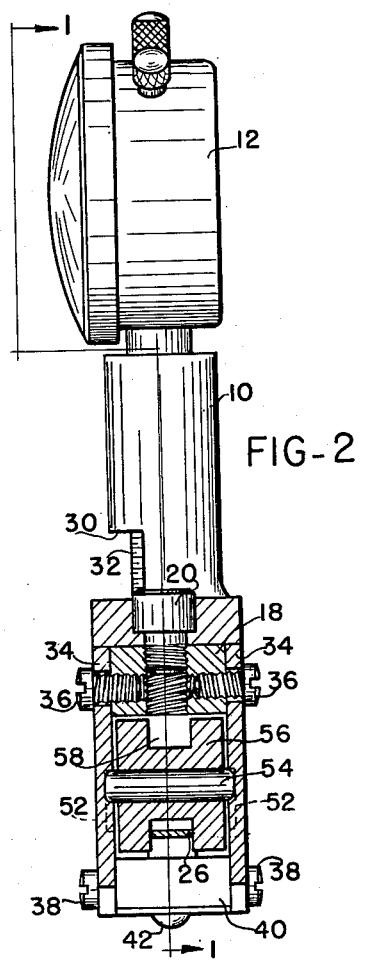
Figure 2 is a side view of the instrument partly in section, as indicated by line 2—2 on Figure 1.
Figure 3:
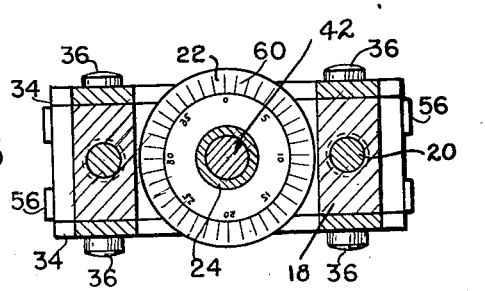
Figure 3 is a plan section through the instrument indicated by line 3—3 on Figure 1.

The roller track member 18 is somewhat thinner than the base of the indicator mounting block 10 for the purpose of receiving on each face of member 18 a cover plate 34, as will be seen in Figures 2 and 3.

These cover plates are adapted for being held in position at their upper ends by the screws 36, and at their lower ends by screws 38. Screws 38 are threaded into a sleeve-like element 40 which forms a pilot for a feeler pin 42. The upper end of feeler pin 42 is shouldered, as will be seen in Figure 1, so that it cannot drop out of the pilot 40 and engages the lower end of spindle 14 of indicator 12 so that vertical movements of the feeler pin 42 will be reflected in a movement of pointer 44 over the indicator scale 46.

The feeler pin 42 is located on an axis that is normal to the plane of the axes of rollers 56, to be described hereinafter, and midway therebetween.

For the purpose of providing accurate alignment of plates 34, roller track 18, and the feeler pin pilot 40, these members may be drilled for receiving the dowel pins, indicated at 48 and 50.

Each of side plates 34 has formed on its inner face on each side a slot 52 extending in a direction parallel with the adjacent surface of roller track member 18. Extending between the slot in each plate 34 and the adjacent slot in the opposite plate is a pin 54, and mounted on each pin 54 is a roller 56, generally spool-shaped in longitudinal cross-section. The purpose of forming the roller spool-shaped is that the undercut central portion 58 is arranged to receive the roll locating cam 26 so that the said cam does not interfere with the outer periphery of the roller, and also so that the instrument can be kept compact.

The two wings of roller locating cam 26 make equal angles with the axis of pin 42, on which axis the cam surfaces of the wings intersect, and this constructional feature, together with the feature of the slots 52 making equal angles with the said axis, provide for equal movements of the rollers in the slots when the member 26 is adjusted.

As will be seen in Figure 1, the peripheries of the two rollers 56 extend outwardly beyond the peripheries of the side plates 34 so that the two rollers, together with the centering pin 42 form the means for obtaining virtual three-point contact with an inside cylindrical surface. Assuming for the moment that such an engagement is made with an inside cylindrical surface and pointer 44 of the indicator is on zero, it will be perfectly evident that a tilting of the instrument in a vertical transverse plane will be sufficient to indicate eccentricity of the surface or lack of true roundness thereof, because such a condition will result in axial movement of the feeler pin, which would immediately be indicated by a deflection to one side or the other of pointer 44.

The instrument according to this invention is adapted for adjustment so that a plurality of surfaces of different sizes can be measured thereby. The adjustment of the instrument is accomplished by rotation of the cam nut 22, and which rotation will operate to move hollow shaft 24 together with the lift cam 26 connected thereto either upwardly or downwardly depending on whichever way the said nut is turned. By selecting a standard pitch for the thread of the hollow shaft 24, such as forty threads per inch, it will be apparent that the graduations on the cylindrical part 28 thereof could be arranged in the manner of the usual micrometer barrel, while cam nut 22 may bear graduations, as indicated at 60 in Figure 3, and which graduations can be forty in number, or a multiple thereof, and be graduated in thousandths.

Regarding the theory of operation of the present instrument, it has been found that if a series of circles are drawn having one point on the circumference of each common, then a straight line drawn through the said point and intersecting the several circles will intersect the said circles at such points that lines drawn from the said points to the centers of the respective circles will make equal angles with a line drawn from the aforementioned common point on the circumferences of the circles through their centers.

Figure 4:
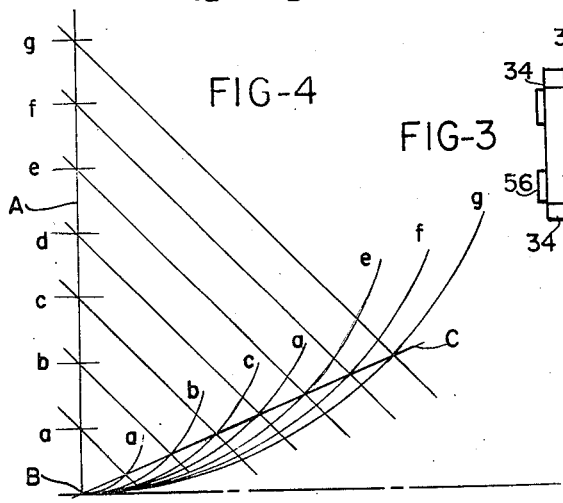
Figure 4 is a chart illustrating the theory of operation of the instrument.

A figure constructed according to this theorum is indicated in Figure 4, wherein the several circle fragments shown and which are lettered a, b, c, d, e, f, and g, have been swung about the centers a, b, c, d, e, f, and g, respectively, with the said centers lying on the same straight line A and the circles having in common point B on line A. Through point B is drawn line C at some predetermined angle to the horizontal, in this case 22½°, and it will be readily apparent that a line drawn from the center of each circle to that point on the circle where it is intersected by line C will make an equal angle with line A, in this case 45°.

It will be apparent that line C need not be drawn at 22½°, but could be disposed at any practical angle, such as 30°, and in which latter case, the angles between line A and the respective radii drawn therefrom to the points of intersection of line C and the circles would make angles of 60° with line A.

The angle that line C makes with the horizontal in Figure 4 is the same angle that the bottom surfaces of roller track member 18 make with the horizontal, and this also is the same angle that the slots 52 make with the horizontal. The particular angle made by the slots and the underneath surface of the roller track member with the horizontal will, of course, be adjusted to meet the particular circumstances in which the instrument is to be used, and, in general, the greater the said angle, the more accurate the gauge will be, but the smaller the range that it will cover.

Similarly, the particular angle that is included between the two wings formed on the lower end of the roller locating cam may be varied in order to meet varying circumstances, and this angle will, in general, be determined by the aforementioned angle of slots 52 in the underside of the roller track member, the spread of the graduations desired on the adjustable parts, and the accuracy desired in the instrument. In the arrangement illustrated, the included angle between the two sides of the roller locating cam is approximately 85° 50', so that each side of the roller locating cam makes an angle with the vertical of approximately 42° 55'.

The calibrations on the cylindrical portion 28 of hollow shaft 24 are adapted for registering with a suitable index mark on the block 10, (not shown) and another suitable index mark on block 10 (also not shown) can be employed for registering with the index marks on the cam nut 22, whereby a ready indication is available at any time of the setting of the gauge.

In operation, once the gauge has been adjusted by turning cam nut 22 to set the gauge for the proper size, the gauge is inserted in the recess to be measured. When the rollers 56 engage the surface of the recess to be measured they will be forced inwardly into engagement with the surface of roller lift cam 26 and the roller track member 18. Inasmuch as each of the rollers has two axially spaced lines of contact with both the surface to be measured and the surface of the roller track member 18, and since the roller axes are mutually parallel, it will be apparent that they will assume a position with their axes parallel with the axis of the recess being measured and will serve to support the instrument in a plane normal to the axis of the recess being measured, whereby highly accurate results will be obtained under all conditions.

The instrument according to this invention may be used as a set gauge by preadjusting the lift cam to a predetermined point and the indicator 12 will then serve to indicate the amount the surface being measured departs from the set position of the gauge.

On the other hand, surfaces can be measured either by placing the instrument in engagement with the surface and then adjusting the lift cam by adjustment of nut 60 until the indicator 12 indicates zero, or the instrument can be preadjusted to approximate the radius or diameter of the surface to be measured and then placed in engagement with the said surface, and the final adjustment thereof made thereafter.

In any case, the eccentricity of the surface being measured can readily be determined merely by rocking the instrument back and forth and at this time it will be apparent that the formation of the rollers so that they have spaced lines of contact with the surface is of importance in insuring that the instrument will not tilt out of a transverse plane and give a faulty indication.

It will be understood that this invention is susceptible to modification in order to adapt it to different usages and conditions, and, accordingly, it is desired to comprehend such modifications within this invention as may fall within the scope of the appended claims.

We claim:

1. In a gauge of the nature described; a frame, a pair of rollers in the frame rotatable about spaced parallel axes, a feeler pin in said frame recepirocable along an axis extending perpendicular to the plane of the axes of said rollers and midway therebetween, an indicator in the frame operatively associated with said pin for indicating the position thereof in the frame, and manually operable calibrated means for moving said rollers in the frame toward and away from the axis of said pin along lines which make equal angles with the axis of said pin and which converge toward the lower end of the pin, said means providing for equal movement of said rollers but in opposite directions, whereby the axis of said pin always remains midway between the axes of said rollers.

2. In a gauge of the nature described; a frame, a pair of rollers in said frame rotatable about spaced parallel axes, each said roller comprising a central undercut portion, a feeler pin mounted in the frame reciprocable along an axis extending perpendicular to the plane of the axes of said rollers and midway therebetween, an indicator in the frame operatively associated with said pin for indicating the relative position thereof in the frame, means in the frame guiding the rollers in angular movement therein relative to said pin, and V-shaped cam means adjustably carried in the frame and engaging the said undercut portions of the rollers for effecting movement thereof in unison toward and away from the axis of said pin.

3. In a gauge of the nature described; a frame, a pair of rollers in said frame rotatable about spaced parallel axes, each said roller comprising an intermediate undercut portion, shaft means extending from opposite ends of said rollers along the axes thereof, slots in the frame receiving said shaft means for guiding the rollers in movements toward and away from each other, a feeler pin mounted in said frame for reciprocation along an axis perpendicular to the plane of the axes of said rollers and midway therebetween, an indicator in the frame operatively associated with said pin for indicating the relative position of the pin in the frame, and cam means adjustably carried by the frame engaging the undercut portions of the rollers for adjusting the rollers in unison toward and away from the axis of said pin, thereby to accommodate the gauge to surfaces of different radii.

4. In a gauge of the nature described; a frame, a pair of rollers rotatable in the frame about spaced parallel axes, each said roller comprising a central undercut portion, each roller having shaft means extending from the opposite faces thereof along the axes of the rollers, said frame being formed with slots therein for receiving said shaft means, a feeler pin mounted in the frame for reciprocation along an axis extending perpendicular to the plane of the axes of said rollers and midway therebetween, the said slots inclining downwardly toward the axis of said pin, a guide block in the frame having surfaces thereon extending parallel with said slots and engaging the peripheries of said rollers on opposite sides of the undercut portions thereof, a cam having a pair of upwardly convergent surfaces thereon, each engaging respectively the undercut portion of one of said rollers, said cam being adjustable in the frame for adjusting said rollers along their respective slots, and an indicator carried by the frame operatively associated with said feeler pin for indicating the relative position thereof in the frame.

5. In a gauge of the nature described; a frame, a member in said frame forming a roller track on each side of the centerline of the frame and said tracks being downwardly convergent, a pair of rollers in the frame having spaced parallel axes and each roller engaging one of said tracks, shaft means for each roller extending along the axis thereof, said frame being formed with slots parallel to said tracks for receiving said shaft means, a feeler pin reciprocable along the centerline of said frame, an indicator carried by the frame operatively associated with the feeler pin, each said roller having an intermediate undercut portion, cam means in the frame having two surfaces thereon upwardly convergent and each engaging respectively the undercut portion of one of the rollers, and calibrated screw threaded means for adjusting said cam means, thereby to move said rollers in unison inwardly and outwardly of the frame of the said gauge.

6. In a gauge of the nature described; a frame, a member in said frame forming a roller track on each side of the centerline of the frame and said tracks being downwardly convergent, a pair of rollers in the frame having spaced parallel axes and each roller engaging one of said tracks, shaft means for each roller extending along the axis thereof, said frame being formed with slots parallel to said tracks for receiving said shaft means, a feeler pin reciprocable along the centerline of said frame, an indicator carried by the frame operatively associated with the feeler pin, each said roller having an intermediate undercut portion, cam means in the frame having two surfaces thereon upwardly convergent and each engaging respectively the undercut portion of one of the rollers, a threaded sleeve on said cam means, a nut rotatable in the frame and engaging said sleeve, and graduations on the sleeve and on the nut for indicating the precise position of adjustment of said cam means.

7. In a gauge of the nature described; a frame, a pair of rollers in the frame rotatable about spaced parallel axes, a feeler pin in said frame reciprocable along an axis extending perpendicular to the plane of the axes of said rollers and midway therebetween, an indicator in the frame operatively associated with said pin for indicating the position thereof in the frame, means for moving said rollers in the frame angularly downwardly toward the axis of said pin and angularly upwardly in the frame away from the axis of said pin, and manually operable calibrated means carried by the frame for effecting the said movement of said rollers therein.

8. In a gauge of the nature described; a frame, a member clamped to the underside of the frame forming a planar roller track on each side of the centerline of the frame and said tracks being convergent downwardly toward the said centerline, a pair of rollers in the frame having spaced parallel axes and each roller engaging one of said tracks, shaft means for each roller extending along the axis thereof, said frame comprising side plates formed with slots therein parallel with said tracks for receiving said shaft means, a feeler pin reciprocable along the centerline of said frame, a pilot sleeve between the side plates reciprocably guiding said feeler pin, each said roller comprising an intermediate undercut portion of reduced diameter, cam means in the frame having two surfaces thereon convergent upwardly and each engaging respectively the undercut portion of one of the rollers, an extension extending upwardly into the frame from said cam means and having a threaded portion thereon, a nut in the frame screw threadedly engaging said threaded portion for adjusting said extension and, therefore, said cam means axially in said frame, the uppermost portion of said extension being free of threads and bearing graduations, said nut likewise being graduated, and said frame being adapted for mounting an indicator for indicating the axial position of said feeler pin therein.

References Cited in the file of this patent

UNITED STATES PATENTS

| Number | Name | Date |
|---|---|---|
| 2,117,841 | Fitzgerald | May 17, 1938 |
| 2,224,728 | Gulliksen | Dec. 10, 1940 |
| 2,547,719 | Rosser | Apr. 3, 1951 |
| 2,560,571 | Hawkins | July 17, 1951 |
| 2,565,844 | Eisele | Aug. 28, 1951 |
| 2,599,835 | Johnson et al. | June 10, 1952 |

FOREIGN PATENTS

| Number | Country | Date |
|---|---|---|
| 126,453 | Great Britain | May 8, 1919 |
| 655,249 | France | Apr. 16, 1929 |
| 487,375 | Great Britain | June 20, 1938 |
| 399,007 | Italy | Oct. 14, 1942 |